(12) United States Patent
Matsuguchi et al.

(10) Patent No.: US 6,827,217 B2
(45) Date of Patent: Dec. 7, 2004

(54) WELDING WIRE CONTAINER

(75) Inventors: Akira Matsuguchi, Fujisawa (JP);
Masami Tano, Fujisawa (JP); Shinji Komatsu, Fujisawa (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 179 days.

(21) Appl. No.: 10/184,801

(22) Filed: Jul. 1, 2002

(65) Prior Publication Data

US 2003/0019776 A1 Jan. 30, 2003

(30) Foreign Application Priority Data

| Jul. 11, 2001 | (JP) | ................................. | 2001-211289 |
| Jul. 11, 2001 | (JP) | ................................. | 2001-211372 |
| Aug. 31, 2001 | (JP) | ................................. | 2001-264878 |
| Mar. 29, 2002 | (JP) | ................................. | 2002-097940 |

(51) Int. Cl.[7] ............................................. B65D 85/00
(52) U.S. Cl. .................... 206/702; 206/395; 229/109; 229/117.25
(58) Field of Search .................... 206/702, 389, 206/395, 408, 809; 229/109, 117.09, 117.21, 117.24, 117.25, 117.26, 117.27, 122.33; 220/754, 495.06, 495.08

(56) References Cited

U.S. PATENT DOCUMENTS

| 2,922,566 | A | * | 1/1960 | Wright | .................. | 229/117.24 |
| 3,204,849 | A | * | 9/1965 | Vinney | .................. | 229/117.33 |
| 4,742,951 | A | * | 5/1988 | Kelly et al. | .................. | 229/109 |
| 4,850,506 | A | * | 7/1989 | Heaps et al. | ........... | 229/122.33 |
| 5,713,510 | A | * | 2/1998 | Walton | .................. | 229/117.25 |
| 5,738,209 | A | * | 4/1998 | Burr et al. | .................. | 206/702 |
| 5,921,391 | A | * | 7/1999 | Ortiz et al. | .................. | 206/702 |

FOREIGN PATENT DOCUMENTS

| EP | 1057751 | 12/2000 |
| JP | 50-118227 | 3/1975 |
| JP | 57-98469 | 6/1982 |
| JP | 10-316312 | 12/1998 |
| WO | WO 98/52844 | 11/1998 |

* cited by examiner

Primary Examiner—Luan K. Bui
(74) Attorney, Agent, or Firm—Oblon, Spivak, McClelland, Maier & Neustadt, P.C.

(57) ABSTRACT

In a welding wire container, an inner cylinder is inserted inside a bottomed outer cylinder, a pedestal is disposed at a bottom of the inner cylinder, and a bag formed by a resin film is disposed between the outer and inner cylinders. A welding wire is received around an axis of the inner cylinder while being dropped in a coiled state. An upper end portion of the resin film bag is closed to seal the welding wire together with the inner cylinder within the bag. When the container is lifted by grasping holder portions, the weight of the welding wire is borne by means of a belt, whereby the container can be transported easily. Further, the welding wire container has a cap which has been subjected to machining for opening the cap. With this welding wire container, the recovery cost is low or it is possible to eliminate the need of recovery, and the entry of water and moisture from the outside can be prevented, thus permitting a long-term storage of the welding wire. Further, a wire draw-out jig can be attached easily to the container.

15 Claims, 19 Drawing Sheets

WELDING WIRE CONTAINER

BACKGROUND OF THE INVENTION

1. Field of the Invention

The present invention relates to a welding wire container for containing a solid wire or a flux-cored wire (FCW) in a coiled state, as well as a welding wire contained in the container. Particularly, the present invention is concerned with a welding wire container improved in recyclability and preventing the entry of water and moisture from the outside.

2. Description of the Prior Art

In a conventional general welding wire container (hereinafter referred to as "pack") of a large capacity, a welding wire is received in a coiled state into a bottomed cylindrical container body with its axis vertical, then an inner surface of the container is coated with resin, a metallic cap is applied to an upper end opening of the container body, and the boundary between the container body and the cap is sealed with a sealing material such as rubber to prevent the entry of water and moisture from the outside. Lower and upper end portions of the bottomed cylindrical body of the pack, which portions are required to have a sufficient strength, are each reinforced using a ring-shaped metallic member.

The pack after use is sometimes used again as a container for a welding wire, but the is usually discarded after being used a predetermined number of times. Before discarding the pack it is necessary that the ring-shaped metallic members and the cap attached to the pack body be separated from the pack body. Alternatively, without such separation, it is necessary to discard the whole as an industrial waste.

On the other hand, the welding wire is manufactured in a coilwise dripped state into the bottomed cylindrical pack. The welding wire is transported and stored in this contained state within the pack and is drawn out continuously from the interior of the pack when it is to be used (Japanese Published Unexamined Patent Application No. Sho 57-98469).

According to the prior art, when the welding wire is to be used, the cap of the pack is removed, a conical wire draw-out jig made of resin is attached to the upper end opening of the pack., a conduit tube is connected to the top of the jig, and one end of the coiled welding wire is drawn out from the interior of the pack and is inserted into the conduit tube, thus allowing the welding wire to be drawn out into the conduit tube. After this work for drawing out the welding wire is over, welding is started. The welding wire draw-out jig is used not only for drawing out the welding wire smoothly without entanglement but also for straightening the welding wire which tends to be coiled.

Thus, the conventional pack is required to go through separation or disposal as an industrial waste, involving the problem that the disposal after use thereof is complicated.

An effective method for solving this problem is to use paper as the material of the pack because a route for recovery of paper as waste and recycle has been established. More particularly, if the whole of the welding wire container is fabricated using paper such as corrugated cardboard, it is easy to recover the container as waste after use and recycle it as a paper product. Besides, because of easy discard, when the pack is used once for storage and transport of the welding wire and after the welding wire contained therein is used up, the pack can be discarded. Consequently, it is possible to omit a wasteful cost for transporting the pack after use to a welding wire manufacturing factory in an empty state of the pack.

However, the paper pack is permits easy entry of water and moisture from the outside, thus giving rise to such a problem as oxidation during storage of the welding wire.

Moreover, a wire draw-out jig for drawing out the welding wire from the container is difficult to be attached to the paper pack and it is necessary to provide a fixing jig separately for mounting the draw-out jig to the paper pack.

SUMMARY OF THE INVENTION

The present invention has been accomplished in view of the above-mentioned problems and it is an object of the invention to provide a welding wire container which can be recovered at low cost or does not require recovery and which can prevent the entry of water and moisture from the exterior and thereby permits the welding wire to be store over a long period. It is another object of the present invention to provide a welding wire container which permits easy mounting thereto of a wire draw-out jig.

A welding wire container according to the present invention comprises a bottomed outer cylinder made of paper, an inner cylinder made of paper and inserted inside the outer cylinder, a bag formed by a resin film and disposed inside the outer cylinder so as to enclose the inner cylinder therein, and a string-like support member extending between the outer and inner cylinders and drawn out to the exterior from a pair of apertures formed in the outer cylinder, with holder portions to be grasped by hands being formed at both externally drawn-out ends of the support member.

In the welding wire container according to the present invention it is preferable that the bag contain a vaporizable rust preventive. For example, the vaporizable rust preventive may be applied to the inner surface of the bag.

Alternatively, it is preferable that a sheet containing the vaporizable rust preventive be disposed above a welding wire coil contained in the container. For example, the vaporizable rust preventive may be applied to a lower surface of the sheet.

The vaporizable rust preventive contains, for example, dicyclohexylamine nitrite (dicyclohexylammonium nitride), "DICHAN" hereinafter, or diisopropylamine nitrite, "DIPAN" hereinafter. The bag is made of polyethylene or polyvinyl chloride as an example.

Preferably, the welding container according to the present invention is provided with a paper cap fitted on an upper edge of the outer cylinder. The inner cylinder may be provided at the bottom thereof with a paper pedestal and a core member may be disposed centrally of the pedestal and coaxially with the outer and inner cylinders. The resin film which constitutes the bag preferably has a thickness of not smaller than 60 $\mu$m. For example, the outer and inner cylinders are each formed in a prismatic shape comprising rectangular side walls. As a result, it becomes easier to assemble the outer and inner cylinders from a single sheet and also becomes easier to fold them after use.

In the welding wire container according to the present invention, the opening of the bag may be closed to seal the welding wire within the bag.

In the welding wire container according to the present invention it is preferable that the outside of the outer cylinder be enclosed in an outer bag formed by a resin film, or a resin film band be wound round the outside of the outer cylinder.

The outer cylinder can be formed in the shape of a bottomed cylinder by bending paper such as corrugated cardboard. Like the outer cylinder, the inner cylinder can be formed by rounding paper such as corrugated cardboard into a cylindrical shape. As the material of the resin film there may be used a material superior in moisture- and water-proofness and water-repellency, e.g., polyethylene or polyvinyl chloride, and the resin film may have a single or multi-layer structure.

In the present invention, a coiled welding wire is received within the inner cylinder and is covered with the resin film bag together with the inner cylinder, then the opening end of the bag is closed to seal the welding wire within the bag, so that it is possible to prevent the entry of water and moisture around the welding wire and hence possible to effect a long period storage of the welding wire. Particularly, since the bag contains a vaporizable rust preventive, or by disposing a vaporizable rust preventive-containing sheet at an upper position in the container, there can be obtained a more effective rust preventing effect for the welding wire contained in the bag.

Further, by enclosing the whole of the container with the resin film bag or by winding a band-like sheet around the entire container, it is possible to prevent the container, which is made of paper (corrugated cardboard), from being deteriorated in its strength due to wetting with water during transport.

In the present invention, since the container is formed of paper such as corrugated cardboard, it is easy to dispose of the container and the container can be recycled easily through a recovery and recycle route.

If a core member is disposed centrally of the bottom of the inner cylinder and coaxially with both inner and outer cylinders, it becomes easier to draw out the coiled welding wire from the container when the wire is to be used. The pack shape differs between a flux-cored wire and a solid wire. In the case of a solid wire, a core member is used in many cases, while in the case of a flux-cored wire, a core member is not used in many cases. In the case of a wire having a high elastic deformation yield strength, entanglement is apt to occur at the time of drawing out the wire from the container. A core member is used to prevent the occurrence of such entanglement at the time of drawing out the wire.

In the present invention there is utilized a double structure of the pack body and between both structures in the double structure is provided a resin film of a single or multi-layer structure, the resin film being formed of a material superior in moisture- and water-proofness and water repellency such as polyethylene and polyvinyl chloride. Since the resin film has a bag structure, it is possible to prevent the entry of water and moisture around the welding wire from the outside. It is preferable that the thickness of the resin film which constitutes the bag be not less than 60 $\mu$m. If the resin film thickness is less than 60 $\mu$m, the film is apt to tear when handled and it is impossible to achieve the objects of the present invention. Preferably, the paper which constitutes the inner and outer cylinders is corrugated cardboard from the standpoint of high strength and easy handleability.

In a further aspect of the present invention there is provided a welding wire container comprising a bottomed, cylindrical container body made of paper and a paper cap which can close an opening of the container body, the cap having been subjected to machining for opening the cap. According to this construction, the mounting of a welding wire draw-out jig becomes easy.

The machining for opening the cap may be forming radial cuts in the cap area exclusive of the edge portion thereof, the cuts extending radially from the center of the cap.

The machining for opening the cap may be forming radial perforations in the cap area exclusive of the edge portion thereof, the perforations extending radially from the center of the cap.

The machining for opening the cap may be scooping a hole in part of the cap. This machining for the scooping may be forming perforations.

An outer surface of the cap having been subjected to the machining for opening the cap may be coated with a sealing film.

Other and further objects, features and advantages of the invention will appear more fully from the following description

BRIEF DESCRIPTION OF THE DRAWINGS

A preferred form of the present invention is illustrated in the accompanying drawings in which.

DETAILED DESCRIPTION OF THE PREFERRED EMBODIMENTS

Welding wire containers embodying the present invention will be described in detail hereinunder with reference to the accompanying drawings.

Figure 1:
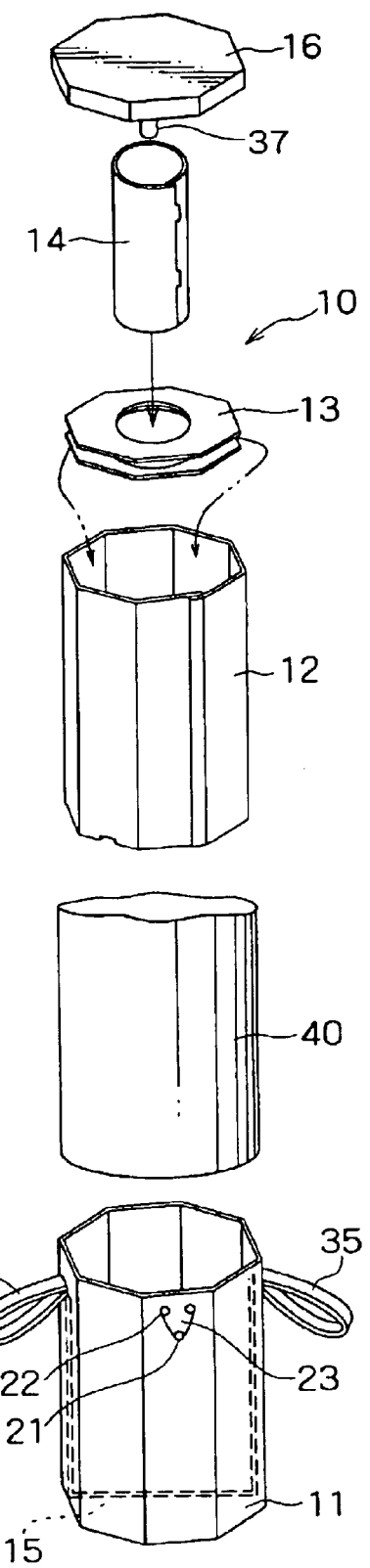
FIG. 1 is an exploded perspective view showing how to assemble a welding wire container according to a first embodiment of the present invention.

Reference will first be made to a welding wire container according to a first embodiment of the present invention. FIG. 1 is an exploded perspective view showing how to assemble the welding wire container, FIG. 2 is an exploded perspective view showing how to assemble a core member, an inner cylinder, and a pedestal, and FIG. 3 is a vertical sectional view of the container.

In FIG. 1, an outer cylinder 11 of the welding wire container, indicated at 10, according to this first embodiment is formed in a bottomed prismatic shape using corrugated cardboard. The outer cylinder 11 has a cross section of a regular octagon shape. An inner cylinder 12 of the welding wire container 10 is formed in a prismatic shape of a regular octagon using corrugated cardboard. The outer and inner cylinders 11, 12 are each formed in a bottomed prismatic shape by bending a sheet of corrugated cardboard. In a lower end of the inner cylinder 12 are formed a pair of cutout portions 26 at opposed positions with respect to the axis of the inner cylinder.

Figure 2:
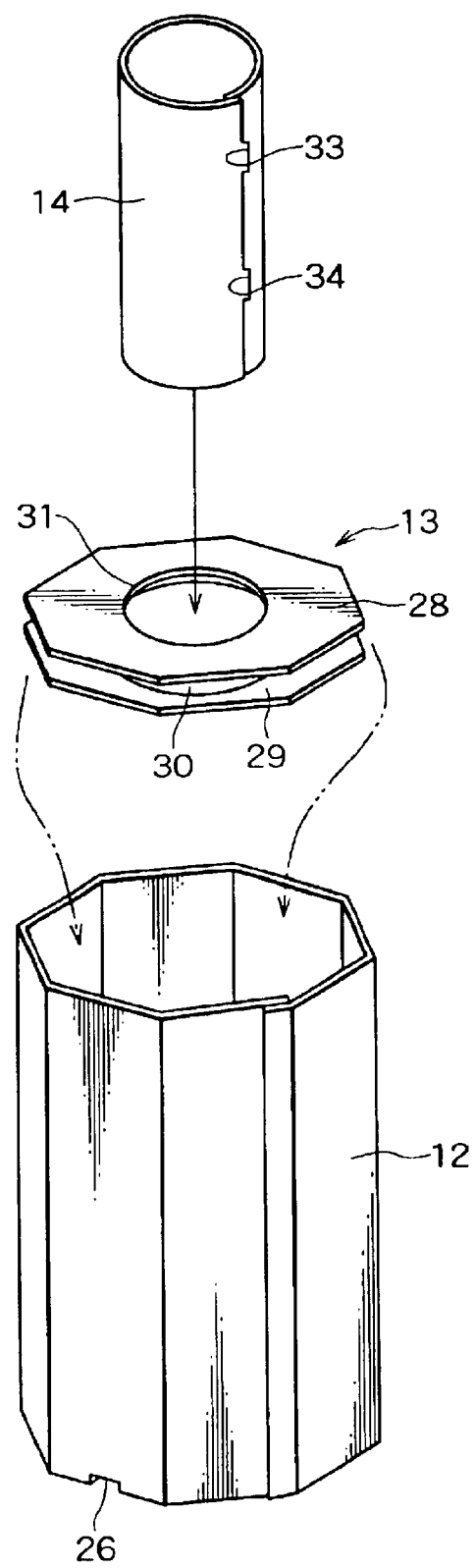
FIG. 2 is an exploded perspective view showing how to assemble an inner cylinder 12, a pedestal 13, and a core member 14.
Figure 3:
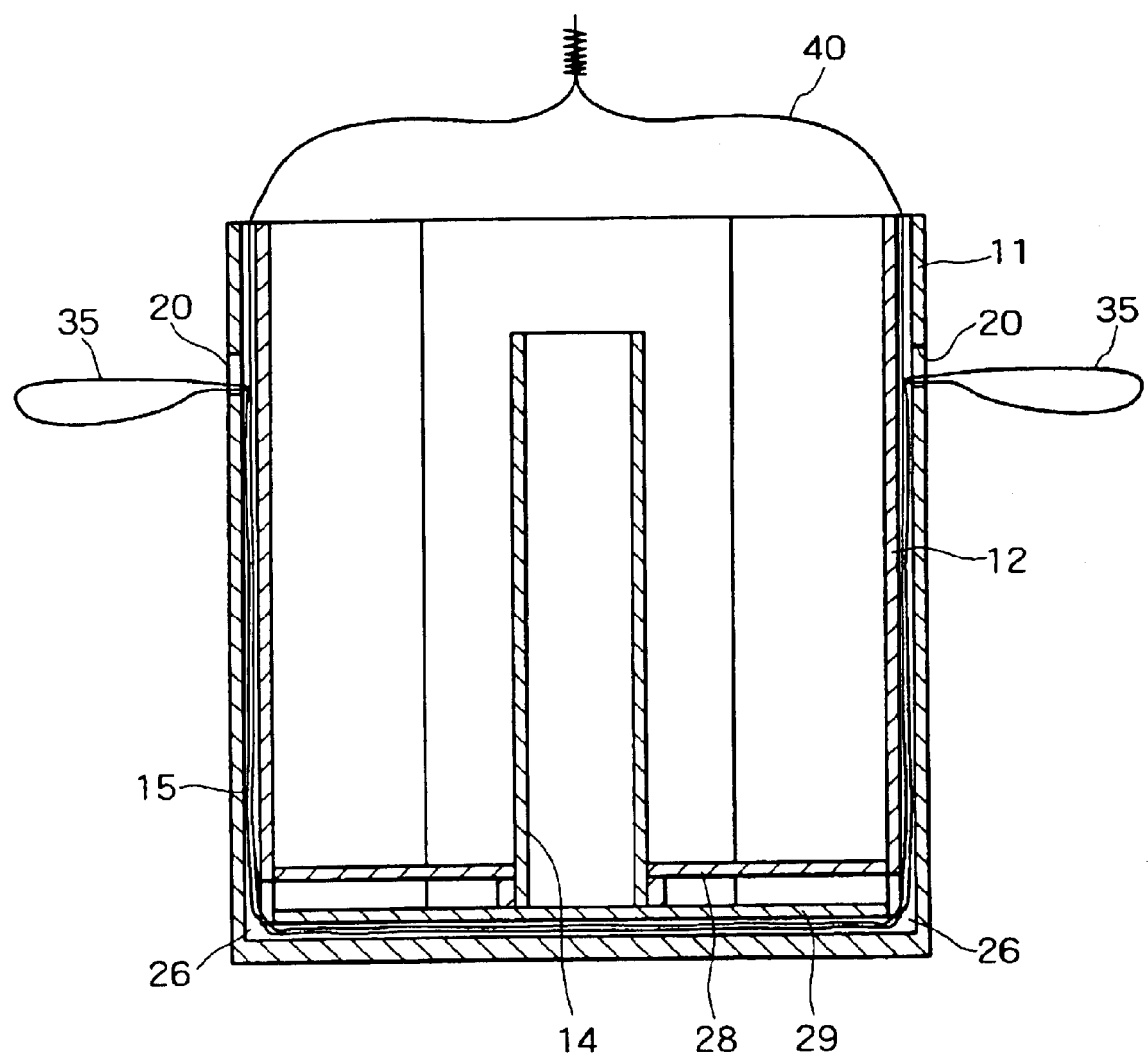
FIG. 3 is a vertical sectional view of the welding wire container of the first embodiment.

As shown in FIG. 2, a pedestal 13 comprises a plate 28 of a regular octagon having a central circular hole 31 and a plate 29 of a regular octagon. Both plates 28 and 29 are disposed in parallel through a cylindrical spacer 30 interposed therebetween, the cylindrical spacer 30 having an inside diameter equal to the diameter of the hole 31. The plates 28, 29 and the spacer member 30 are bonded together with an adhesive. A core member 14 is formed by rounding corrugated cardboard into a cylindrical shape. A pair of insertion grooves 34 are formed in one abutting end of the core member 14, while a pair of lugs 33 are formed on an opposite abutting end of the core member. The lugs 33 are inserted into the grooves 34 to ensure the cylindrical shape of the core member 14. An outside diameter of the core member 14 is substantially equal to the diameter of the hole 31. The core member 14 is inserted at its lower end portion into the hole 31 of the pedestal 13 and is thereby connected to the pedestal. It is not always necessary to join the plates 28, 29 and the spacer member 30 with use of an adhesive. The core member 14 and the pedestal 13 can be connected and assembled by merely fitting the lower end portion of the core member 14 into the hole 31 and the spacer member 30. The pedestal 13 and the core member 14 are also made of paper such as corrugated paper.

A cap 16 has a shape such that flanges extend respectively at right angles from edge portions of a regular octagon plate. The flanges are dimensioned such that they are brought into contact and fitted on outer side faces of the outer cylinder 11. With the flanges thus fitted on the outer cylinder 11, the cap 16 is mounted to an upper opening end of the outer cylinder. In the cap 16, a pair of ring-like elastic members 37 are provided at lower edges of a pair of opposed flanges. On the outer cylinder 11 side, a pair of engaging pieces 23 are provided at positions which mate with the elastic members 37 when the cap 16 is fitted on the outer cylinder. The engaging pieces 23 are each a small triangular piece connecting a pair of small-diameter holes 22 formed at upper positions and a large-diameter hole 21 formed at a lower position. The portion between the pair of small-diameter holes 22 and the large-diameter hole 21 are cut off from the outer cylinder, so that each engaging piece 23 can bend with the line connecting the pair of small-diameter holes 22 as a bending line. The elastic member 37 can be retained by the engaging pieces 23 when closed and can be released from the retained state by lifting the engaging pieces 23. The elastic members 37 are rubber bands for example. The cap 16 is made of paper such as corrugated cardboard.

As shown in FIG. 3, a pair of holes 20 are formed in upper positions of a pair of opposed side faces of the outer cylinder 11 and a belt 15 is disposed along inner surfaces of the outer cylinder and is drawn out to the exterior of the outer cylinder through the holes 20. Both end portions of the belt 15 are turned back outside the outer cylinder 11 and are fixed to the belt so as to form loops. Holder portions 35 to be grasped by hands are constituted by the loop portions of the belt 15. The belt 15 as a string-like support member is positioned between the bottomed outer cylinder and the inner cylinder, so that not only it is possible to prevent direct contact of the belt with wire, but also the shape of the container can be retained when lifting the holder portions. The belt 15 has, for example, width of 50 mm and thickness of 2 mm, as the string-like support member.

A bag 40 is formed using a resin film and has a size such that it encloses the inner cylinder 12 therein and is disposed inside the outer cylinder 11. It is preferable that the thickness of the bag 40 be not less than 60 $\mu$m in order to prevent rupture or breaking of the bag during an assembling work. The resin film which constitutes the bag 40 is formed of a material superior in moisture- and water-proofness and water repellency such as, for example, polyethylene or polyvinyl chloride. The resin film may be formed as a single- or multi-layer structure of such a material. In the case of a multi-layer structure, it is preferable that the entire thickness be not less than 60 $\mu$m.

Next, the following description is provided about the operation of the welding wire container constructed as above and of welding wire contained therein. As shown in FIG. 1, etc., in a state in which the belt 15 is laid along inner side faces and inner bottom surface of the outer cylinder 11 and the holder portions 35 are drawn out to the exterior from the holes 20, the resin film bag 40 is placed inside the outer cylinder, further, the inner cylinder 12 is inserted into the outer cylinder 11 and the pedestal 13 is forced into the inner cylinder 12 until reaching the lower end of the inner cylinder. In this way the container 10 is assembled with the resin film bag 40 interposed between the outer cylinder 11 and the inner cylinder 12. Then, with the holder portions 35 grasped, the container 10 is conveyed to a welding wire manufacturing line.

Figure 4:
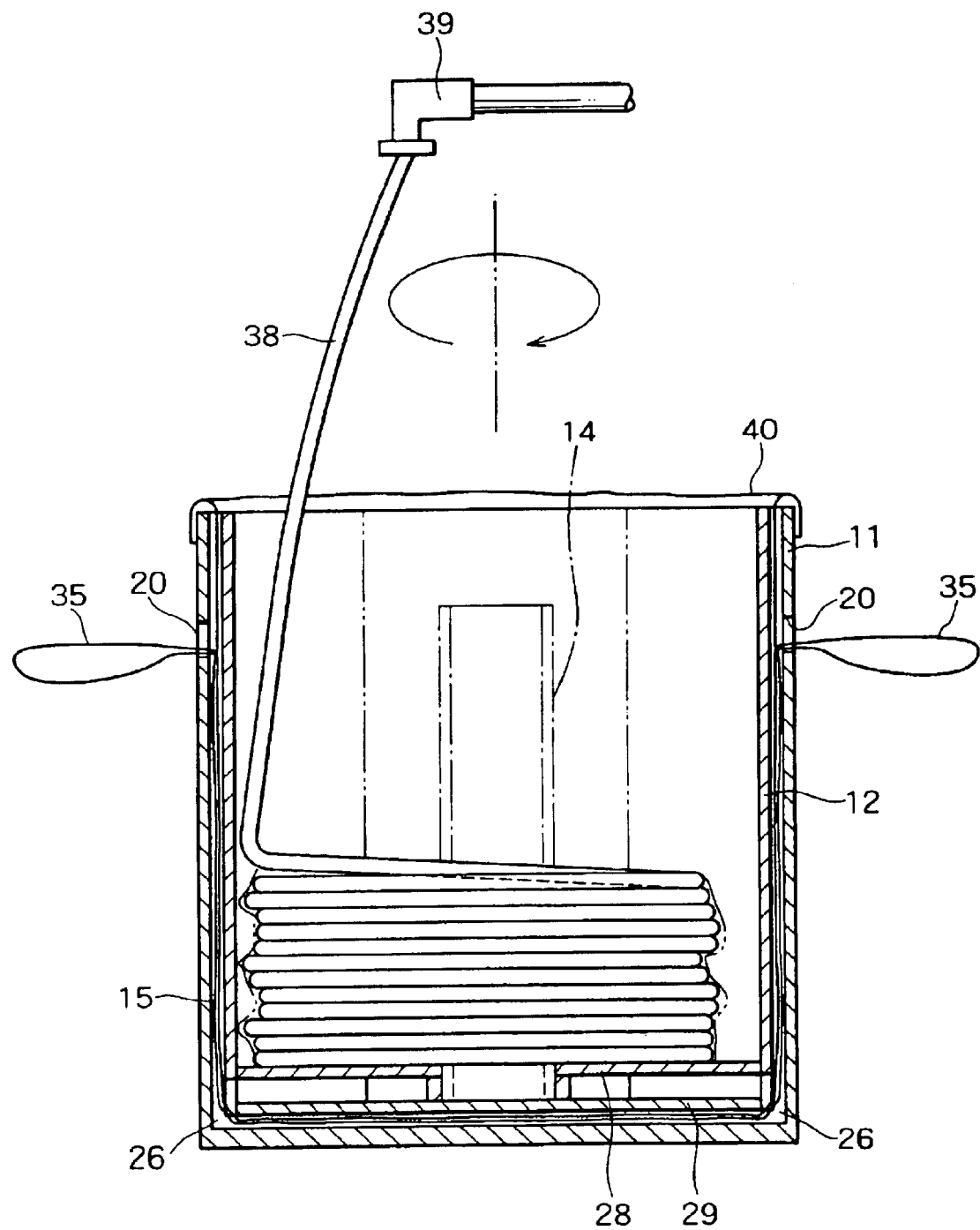
FIG. 4 is a vertical sectional view showing how to accommodate a welding wire into the container.

In the welding wire manufacturing line, as shown in FIG. 4, a welding wire 38 which has been manufactured is discharged through a winding unit 39 into the container. The winding unit 39 rotates about the axis of the inner cylinder 12, so that the welding wire 38 which has passed the winding unit 39 is dropped spirally into the inner cylinder, whereby the welding wire is received in a coiled state within the inner cylinder 12.

Figure 6:
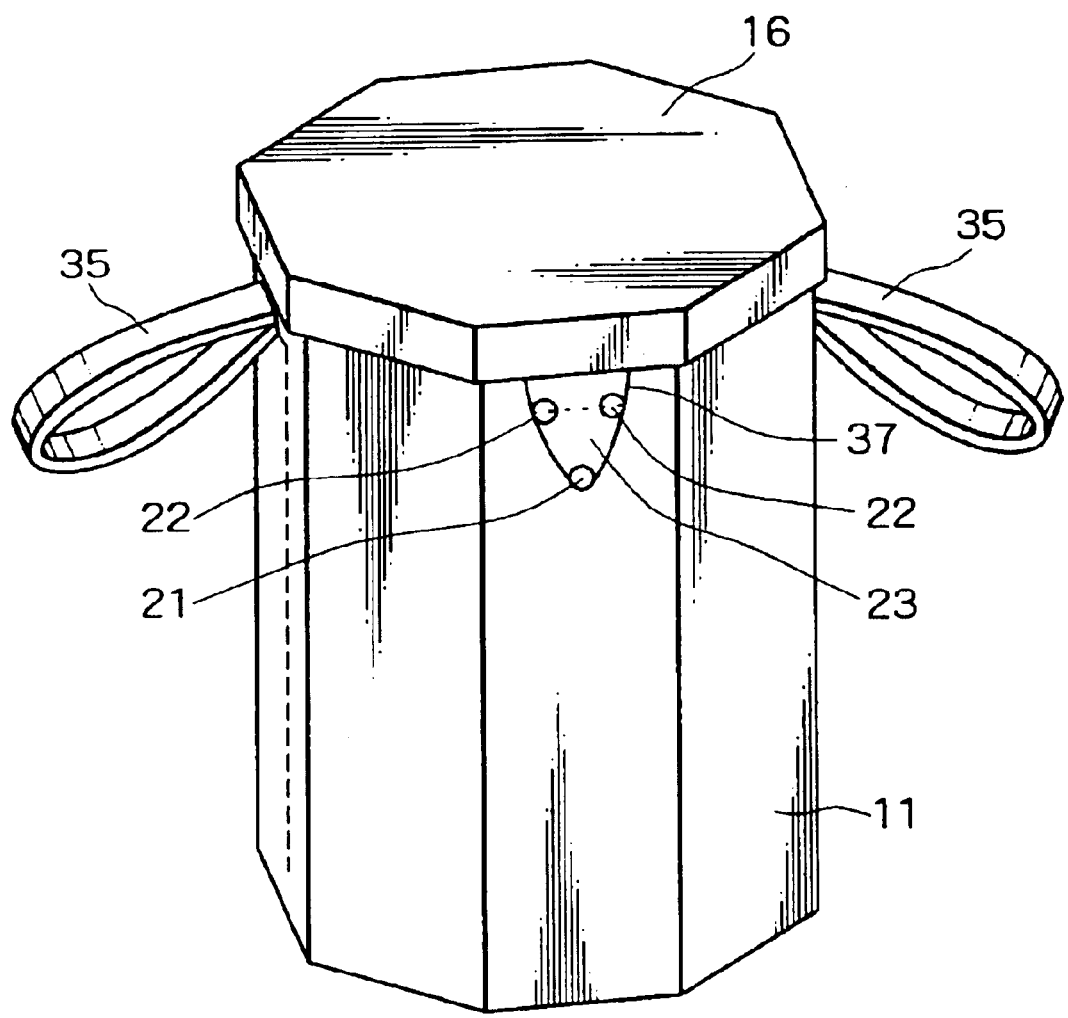
FIG. 6 is a perspective view showing a cap-mounted state.

By subsequently closing an upper opening of the bag 40 the welding wire 38 is sealed within the bag together with the inner cylinder 12 and the pedestal 13. Then, as shown in FIG. 6, the cap 16 is fitted on the outer cylinder 11, the engaging pieces 23 are bent outside the outer cylinder, the pair of elastic members 37 are passed on the back sides of the engaging pieces 23, and the engaging pieces are restored to their original positions, whereby the elastic members 37 pass through the small-diameter holes 22 and are engaged with the engaging pieces 23. In this way the cap 16 is fixed to the outer cylinder 11.

The welding wire container can be conveyed by grasping and lifting the holder portions 35. The weight of the welding wire is borne by the belt 15 provided with the holder portions 35, with no substantial imposition of the welding wire weight on the outer and inner cylinders 11, 12 and the pedestal 13 and further on the bag 40. Thus, there is no fear that the outer cylinder made of corrugated cardboard, etc. may be broken by the weight of the welding wire. Where required, the core member 14 is inserted into the center of the coiled wire, whereby it is possible to prevent entanglement of the wire when drawn out. As shown in FIGS. 2 and 3, the core member 14 is inserted into the hole of the pedestal 13, provided these figures do not illustrate a state in which the wire is in use, but are for only explaining the relation between the core member 14 and the pedestal 13.

In the present invention, since the welding wire 38 is sealed within the bag 40, it is possible to prevent the entry of water and moisture around the welding wire from the outside, and thus the welding wire can be kept water- and moisture-proof over a long period. The container 10 after use is disposed of as a paper product after removal of both resin film bag 40 and belt 15. In this case, the bag 40 and the belt 15 can be removed easily by merely drawing out the inner cylinder 12 from the outer cylinder 11. Thus, the work required for their removal is easy. The container after removal of the bag 40 and belt 15 can be placed as a corrugated cardboard product on the recovery and recycle route in the market. The disposal of the container is thus very easy.

The prismatic shape of the container is not limited to a regular octagon insofar as the shape adopted is a polygonal shape. By thus making the container shape prismatic, the outer and inner cylinders which constitute the container can be folded easily at the time of disposal of the container and thus the container, when it is to be disposed of, can be conveyed easily. In the present invention, however, no limitation is made thereto. For example, the container may be formed in a cylindrical shape, as shown in FIGS. 7 and 8.

Figure 7A:
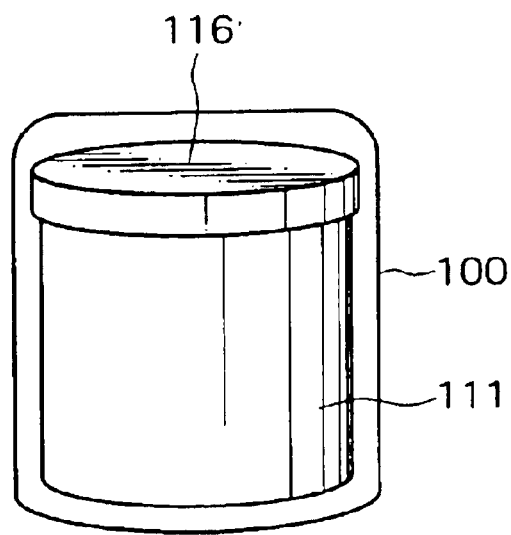
FIGS. 7a and 7b are perspective views showing an exterior finishing method for the container.

Further, as shown in FIG. 7a, by fitting a disc-like cap 116 with flange onto an outer cylinder 111 and thereafter covering the whole with a resin film bag 100 (exterior finish), the container 10 is prevented from being wet with rain water or the like during transport of the welding wire and it is possible to prevent deterioration in strength of the container caused by water-wetting of the container which is made of paper such as corrugated cardboard.

Figure 7B:
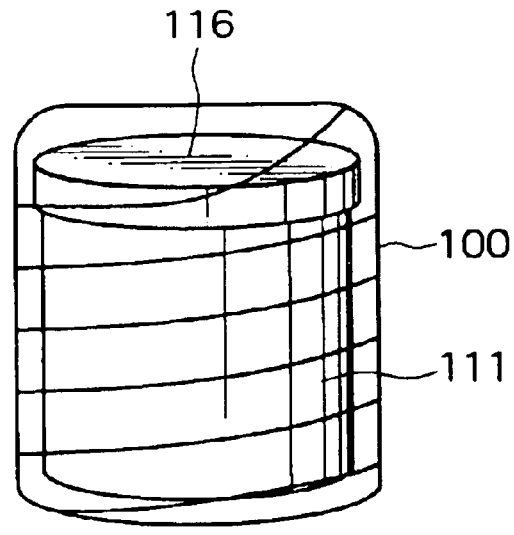

The covering of the entire container with the resin film may be done by winding a band-like sheet 101 formed by a resin film around the outer cylinder 111, as shown in FIG. 7b.

Figure 8A:
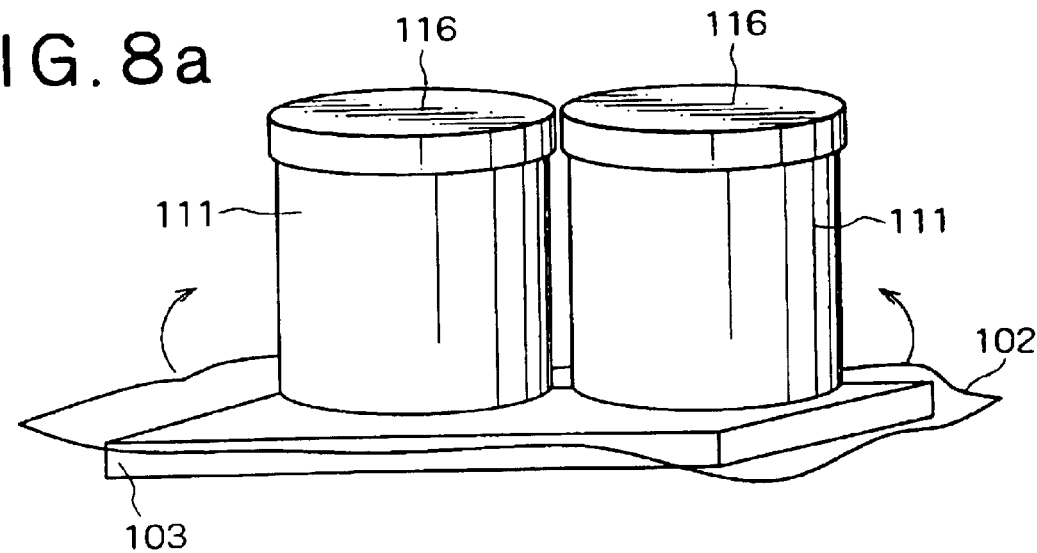
FIGS. 8a and 8b are perspective views also showing an exterior finishing method for the container.
Figure 8B:
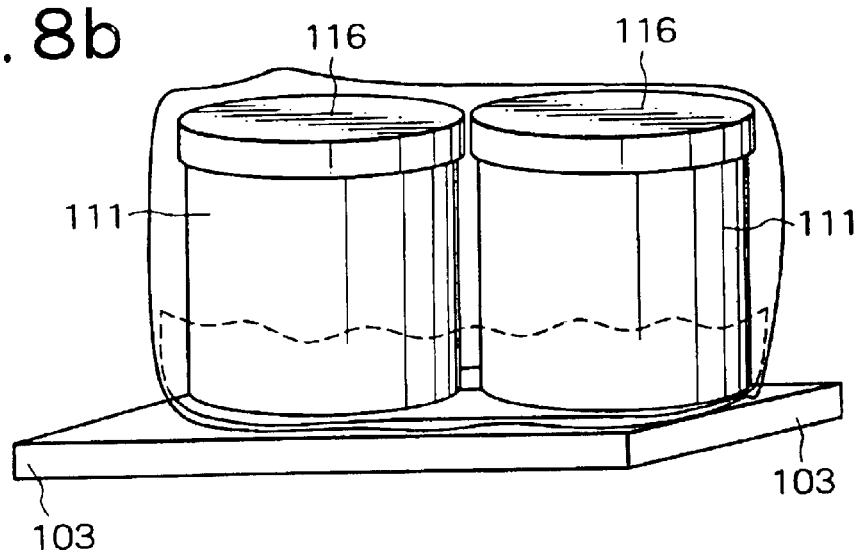

Such a method as shown in FIG. 8 may be adopted. That is, as shown in FIG. 8a a resin film sheet 102 is put on a pallet 103 and plural, two or three, containers are placed on the sheet 102, then, as shown in FIG. 8b, all the containers are together covered with the sheet 102. In this way plural containers can be covered at a time.

A description will now be given of a second embodiment of the present invention. In this embodiment the bag 40 contains a vaporizable rust preventive. The vaporizable rust preventive can be added into the bag 40 by kneading it into the resin film which constitutes the bag at the time of fabrication of the film. Alternatively, the vaporizable rust preventive may be applied to the inner surface of the bag 40 after the bag has been formed using the resin film.

Figure 9A:
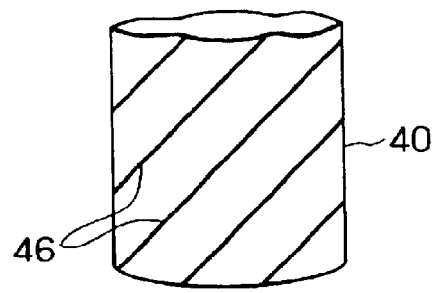
FIGS. 9a and 9b are diagrams of bags, illustrating a second embodiment of the present invention.
Figure 9B:
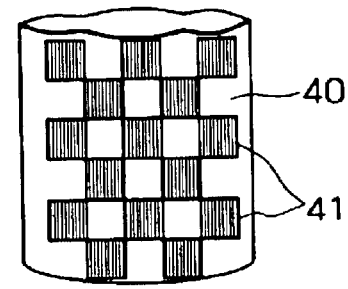

In case of applying the vaporizable rust preventive to the inner surface of the bag 40, it is optional whether the rust preventive is to be applied throughout the whole inner surface of the bag or is to be applied locally as shown, for example, in FIGS. 9a and 9b. In FIG. 9a, the vaporizable rust preventive is applied using a large number of parallel oblique lines, while in FIG. 9b it is applied using a lattice-like pattern.

As the vaporizable rust preventive there may be used, for example, DICHAN and DIPAN, which may be used each alone or in combination.

In the case where the resin film 40 is disposed between the outer and inner cylinders 11, 12 made of paper as in the first embodiment illustrated in FIG. 1, it is possible to surely prevent the entry of water and moisture from the outside, but since the inner cylinder 12 is made of paper, both moisture contained in the paper and moisture contained in the atmosphere upon loading of the welding wire into the container may be condensed into dew due to a sudden drop of the air temperature, causing rust of the welding wire. Placing a bagged rust preventive into the container may be effective in preventing the occurrence of such rust. However, the rust preventive thus introduced into the container is present on the bottom of the container, so does not exhibit a rust preventing effect for the coiled welding wire portion present in an upper portion of the container. Besides, a worker in charge may forget to place the bagged rust preventive into the container.

Figure 10A:
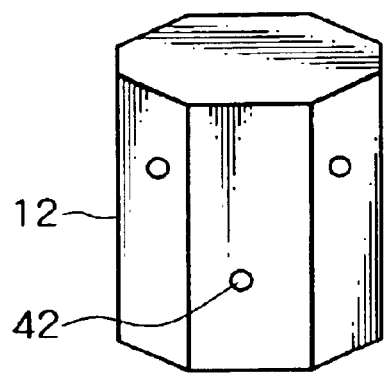
FIGS. 10a and 10b are diagrams of inner cylinders, illustrating modifications.
Figure 10B:
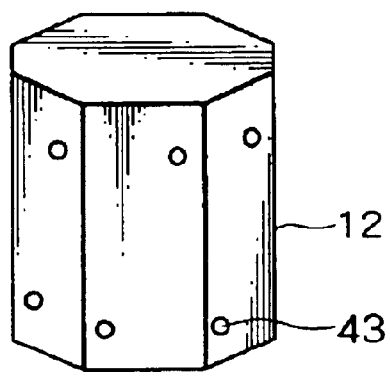

But by incorporating the vaporizable rust preventive in the bag 40 itself or by applying it to the inner surface of the bag as in the second embodiment, the rust preventive which vaporizes from the bag 40 itself or from the coating layer on the bag inner surface exhibits a rust preventing effect uniformly for the coiled welding wire disposed within the container. As a result, a satisfactory rust preventing effect even for the upper coiled wire portion in the container. Besides, the rust preventive is sure to be fed into the container as long as the bag 40 is used. The use of a bagged rust preventive may be added to the above mode of use of the rust preventive in the second embodiment.

Where the bag 40 contains the vaporizable rust preventive, it is preferable that plural holes 42 and 43 be formed in the inner cylinder 12 which is disposed inside the bag 40. It is not always necessary for the holes 42 and 43 to be circular. FIG. 10a shows a case where relatively large holes 42 are formed, while FIG. 10b shows a case where relatively small holes 43 are formed in a large number. Forming the holes 42 and 43 to the extent that they do not decrease the strength of the inner cylinder 12 is advantageous in that the gas of the rust preventive issued from the bag 40 becomes easier to pass through the inner cylinder and reach throughout the coiled welding wire.

Figure 11A:
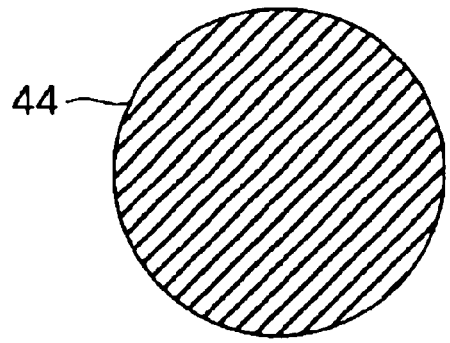
FIGS. 11a and 11b are diagrams of sheets, showing a third embodiment of the present invention.
Figure 11B:
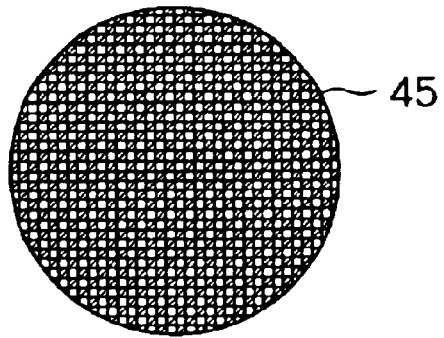

Description is now directed to a third embodiment of the present invention. In this third embodiment, a sheet which contains a vaporizable rust preventive is disposed in an upper position within the container. For example, the sheet is disc-like as shown in FIGS. 11a and 11b. The sheet shown in FIG. 11a, which is indicated at 44, is applied with the vaporizable rust preventive using parallel oblique line patterns, while the sheet shown in FIG. 11b, which is indicated at 45, is applied with the vaporizable rust preventive using a lattice-like pattern. With the rust preventive-coated side down, the sheet 44 or 45 is placed at an upper position in the container with the coiled welding wire received therein, namely, it is placed on the coiled wire within the container. In case of using the core member 14, a central portion of each of the sheets 44 and 45 is gouged out in a circular shape and the core member is inserted through the resulting circular hole, allowing the sheet to be placed on the coiled wire.

The method for applying the vaporizable rust preventive to the sheet is not limited to such patternwise application methods as shown in FIGS. 11a and 11b, but the vaporizable rust preventive may be applied to the whole surface of the sheet. Alternatively, the sheet may be constituted by a resin sheet and the vaporizable rust preventive may be kneaded into the resin sheet during fabrication of the sheet, thereby allowing the rust preventive to be incoporated in the sheet. As examples of the vaporizable rust preventive are included the foregoing DICHAN and DIPAN. The sheet having the vaporizable rust preventive is not limited to a resin sheet, but may be a paper sheet. Further, the shape of the sheet is not limited to a disc shape.

Also in this third embodiment, as in the previous second embodiment, the gas of the vaporizable rust preventive is issued from the sheet and the surroundings of the coiled welding wire in the container are filled with the rust preventive, thus affording a uniform rust preventing effect for the coiled wire.

Figure 12:
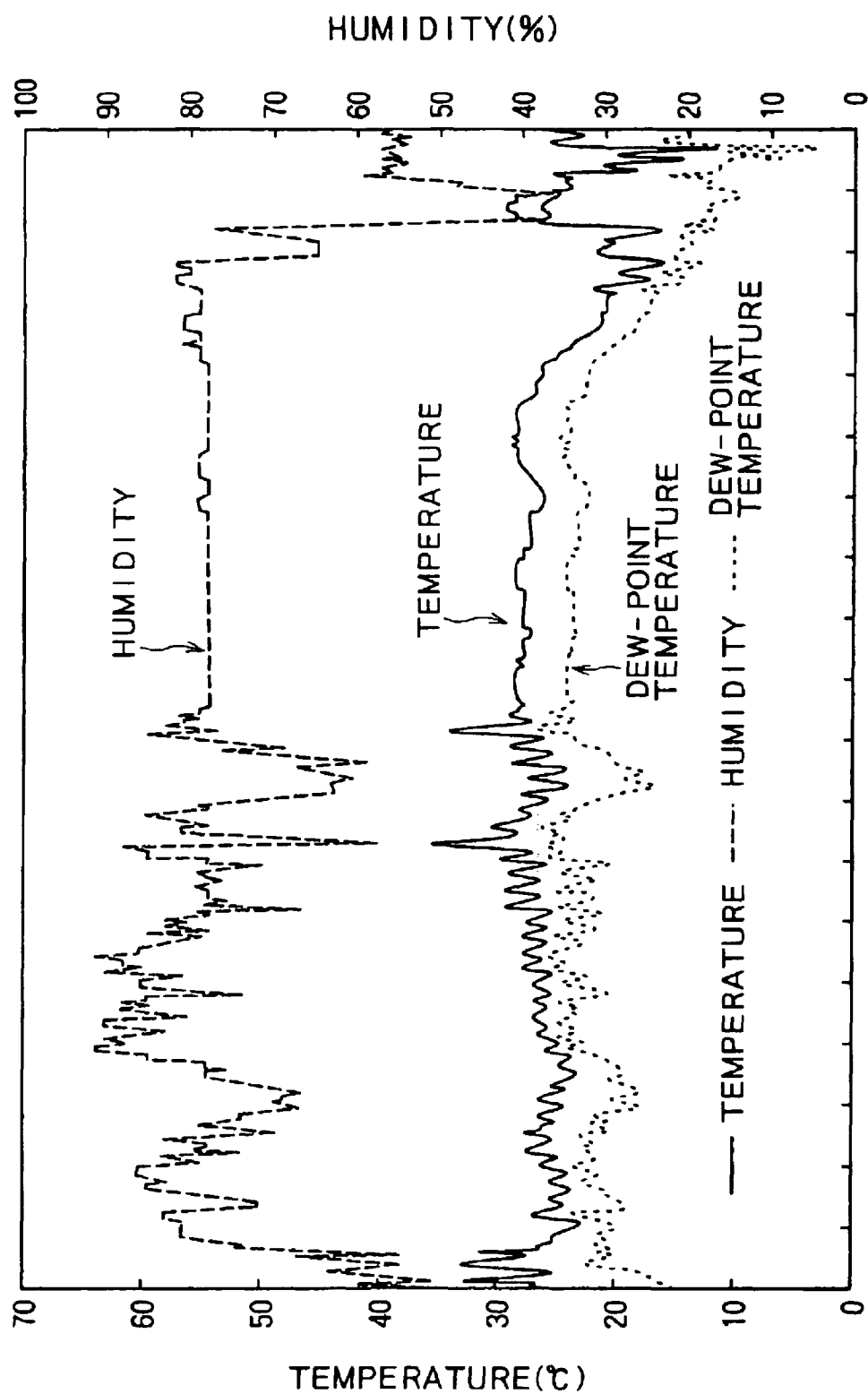
FIG. 12 illustrates humidity, temperature, and dew-point temperature of a test environment.

Effects obtained in the above first to third embodiments of the present invention will now be described with reference to comparative examples which are outside the scope of the present invention. FIG. 12 shows humidity, temperature and dew-point temperature in a test environment. Welding wires were allowed to stand for three months in this test atmosphere. Table 1 below shows materials of bags, whether a vaporizable rust preventive is contained in each bag or not, and the back thickness. Coiled welding wires were wrapped in the bags. In Table 1, in the column "Process Workability," good workability is represented by a circle ○ and the occurrence of bag rupture during the work is represented by a triangle Δ. In the column "Anti-hygroscopicity," a case where a percent (%) increase in water content of each wire after the test is less than 10% as compared with that before the test is represented by a circle ○, the said percent increase of 10% or more and less than 30% is represented by a triangle Δ, and the said percent increase of 30% or more is represented by a cross X. The present increase in water content of the wire after the test relative to that before the test is expressed in terms of (amount of increase in wire water content after the test)/(wire water content before the test)×100. Further, in the column "Occurrence of Rust," a rust-free condition is represented by ○, a slight degree of rust not recognized as weld defect is represented by Δ, and the occurrence of rust is represented by X.

Figure 5:
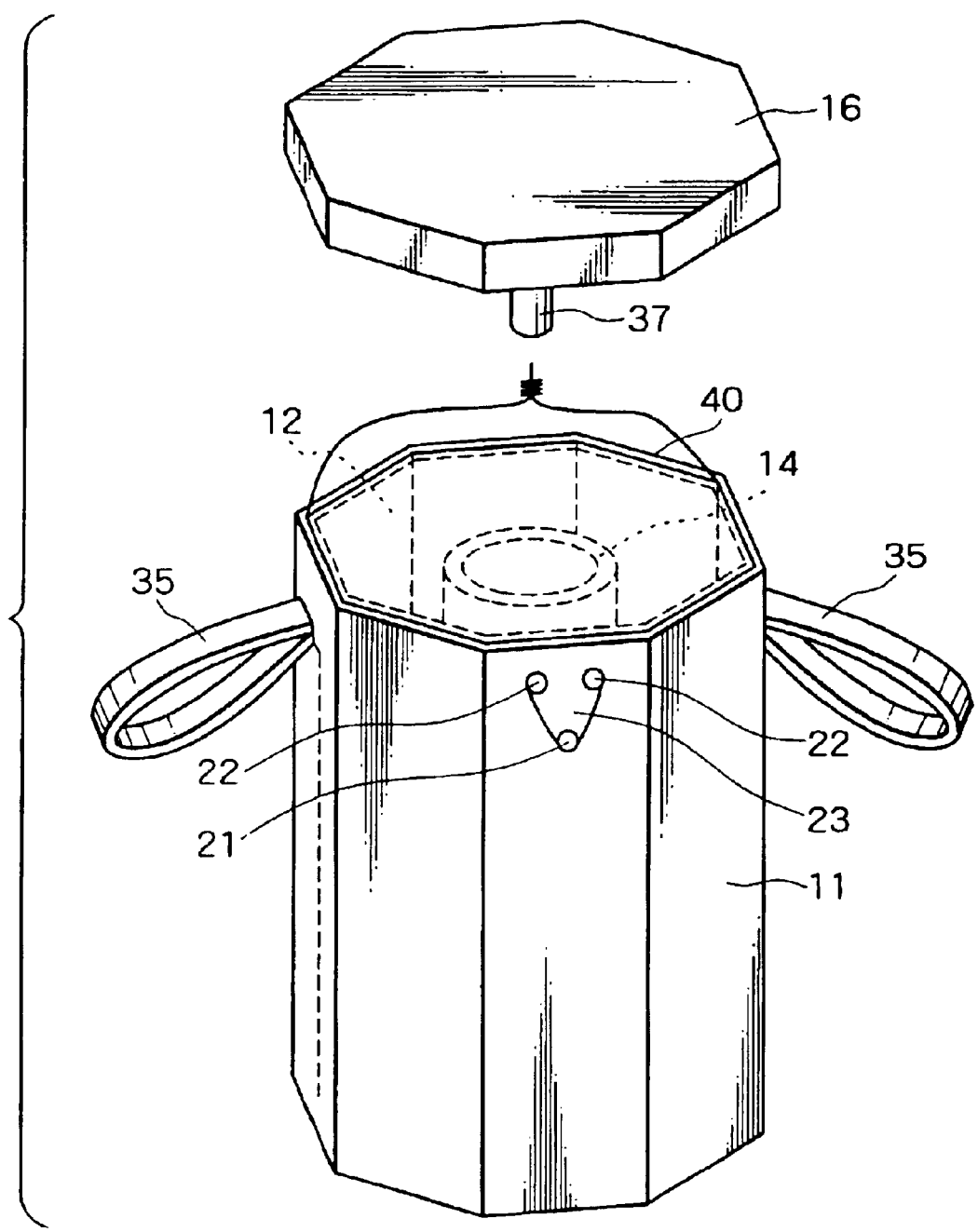
FIG. 5 is a perspective view showing how to mount a cap.

In Table 1, "PE" and "PVC" stand for polyethylene and polyvinyl chloride, respectively. As to the welding wire, a flux-cored wire is JIS Z3313 YFW C50DR and a solid wire is JIS Z3312 YGW11. Anti-hygroscopicity was evaluated using a flux-cored wire and the occurrence of rust was evaluated using both flux-cored wire and solid wire (both unplated and plated wires). As to the pack, there was used the octagon pack shown in FIG. 5.

TABLE 1

| Test No. | Material of Bag | Bag Rust Preventive | Bag Thickness | Process Workability | Anti-hygroscopicity | Rustproof Sheet | Occurrence of Rust |
|---|---|---|---|---|---|---|---|
| Comparative Example | | | | | | | |
| 1 | not used | not used | — | ○ | X | not used | X |
| 2 | Paper | not used | 10 | Δ | X | not used | X |
| 3 | Paper | not used | 40 | Δ | X | not used | X |
| Example | | | | | | | |
| 4 | PE | not used | 30 | Δ | Δ | not used | Δ |
| 5 | PVC | used | 50 | Δ | Δ | not used | Δ |
| 6 | PE3 layer | used | 43 | Δ | Δ | not used | Δ |
| 7 | PE | used DICHAN | 70 | ○ | ○ | not used | ○ |
| 8 | PE | not used | 70 | ○ | ○ | used DICHAN | ○ |
| 9 | PE | not used | 100 | ○ | ○ | not used | Δ |
| 10 | PVC | not used | 100 | ○ | ○ | used DICHAN | ○ |
| 11 | PE | used DICHAN | 100 | ○ | ○ | used DICHAN | ○ |
| 12 | PE | not used | 40 | Δ | Δ | used | Δ |
| 13 | PE | used DICHAN | 40 | Δ | Δ | used | Δ |
| 14 | PE | not used | 100 | ○ | ○ | paper | Δ |

As shown in FIG. 1, Comparative Example 1 is inferior in anti-hygroscopicity of wire and the occurrence of rust because a bag is not used therein. Comparative Examples 2 and 3 employ a bag, but since the material thereof is paper, there is recognized any moistureproofing effect and there occurred rust as in comparative Example 1. Examples 4 to 6, 12, and 13, which employ resin films, are superior in the column of rust occurrence as compared with Comparative Examples 1 to 3. Examples 7 to 11 and 14 are superior in anti-hygroscopicity because of thick resin films, which are not less than 60 μm in thickness. Besides, since Examples 8, 10, and 11 employ rust-proof sheets and Examples 7 and 11 employ rust-proof bags, they are still superior in antihygroscopicity and the occurrence of rust.

The following description is now provided about fourth to eighth embodiments as embodiments which facilitate mounting of a wire draw-out jig.

Figure 13:
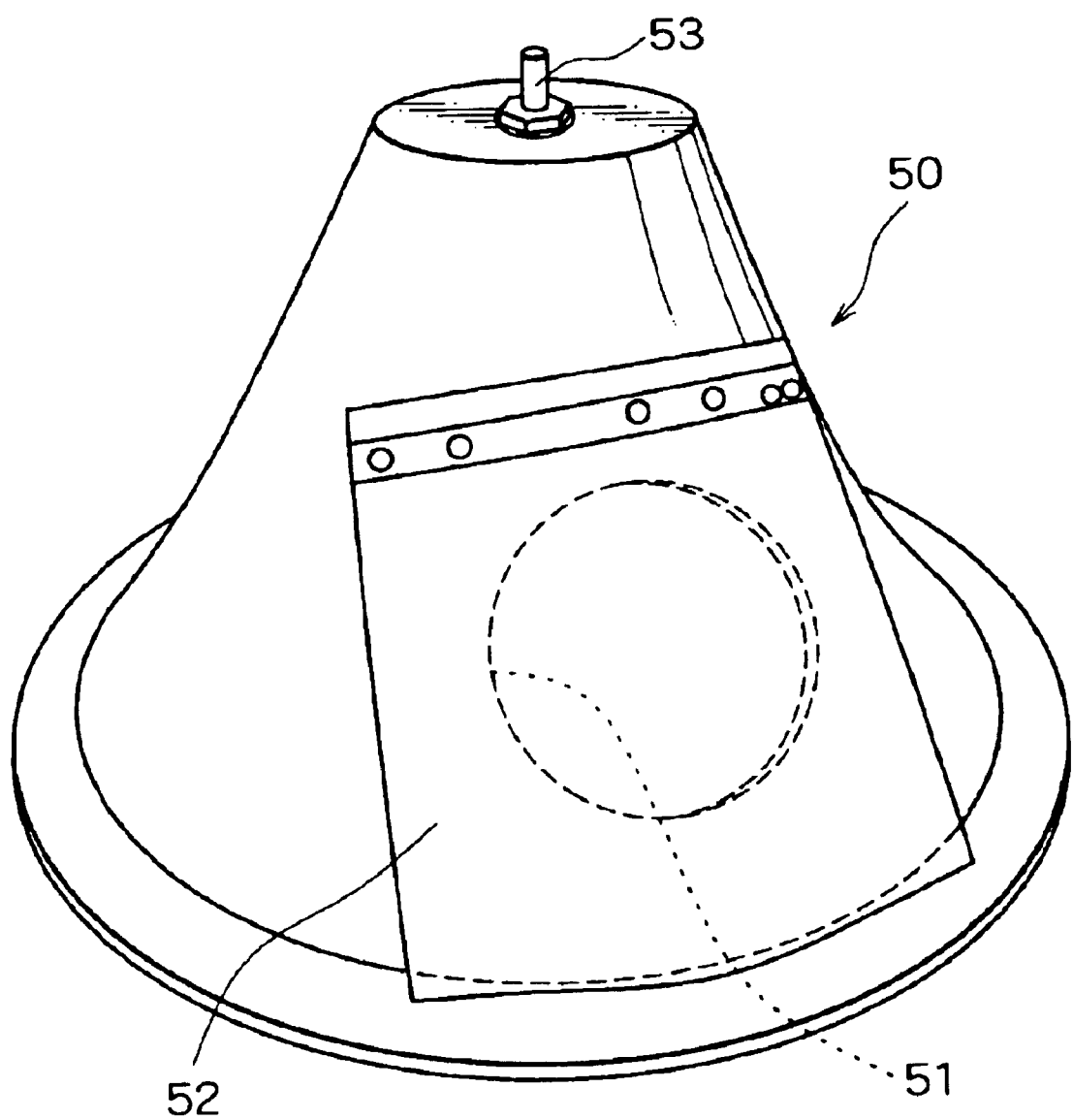
FIG. 13 is a perspective view showing a wire draw-out jig.

As shown in FIG. 13, a wire draw-out jig 50 is conical and a connector 53 for connection with a conduit tube is connected to a top of the jig 50. The connector 53, whose outer surface is formed with threads, is in a cylindrical shape so that a welding wire can pass through the center thereof. The wire draw-out jig 50 is formed with an opening 51, which opening is covered with a lid plate 52 which can open and close the opening. The wire draw-out jig 50 is formed by a transparent acrylic plate or the like.

Figure 14A:
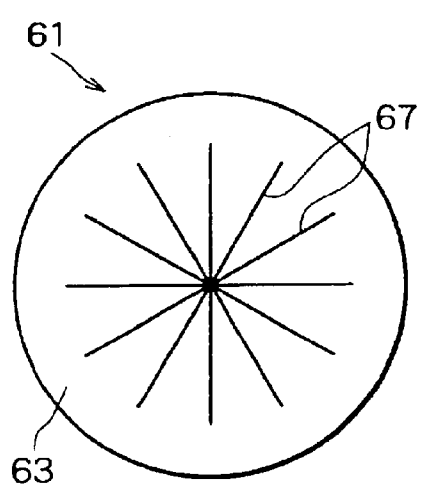
FIG. 14a is a plan view of a cap used in a fourth embodiment of the present invention and FIG. 14b is a perspective view showing a mounted state of the cap to a container body.
Figure 14B:
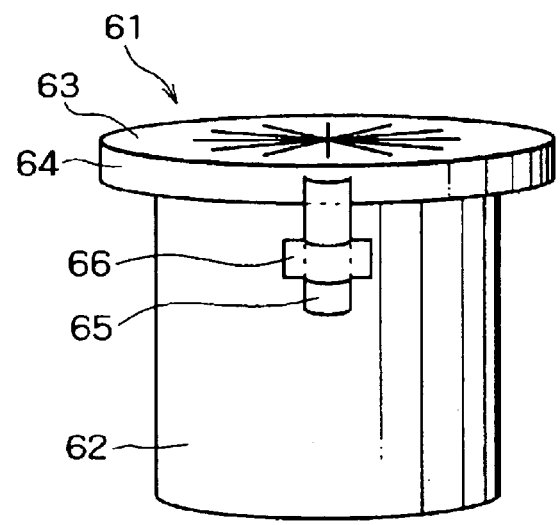

A welding wire container according to a fourth embodiment of the present invention will now be described with reference to drawings attached hereto. FIG. 14a is a plan view of a cap 61 used in the welding wire container of the fourth embodiment and FIG. 14b is a perspective view thereof. A container body 62 is in the shape of a bottomed cylinder, and the cap 61 is fitted on an upper-end opening portion of the container body 62 so as to close the opening portion. The container body 62 and the cap 61 are made of paper, e.g., corrugated cardboard.

The cap 61 has a disc-like portion 63 and an edge portion 64 of the disc-like portion. Engaging portions 65 for fixing the cap 61 are fixed to the edge portion 64. On the peripheral surface of the container body 62 are formed retaining portions 66 for retaining the engaging portions 65. By retaining the engaging portions 65 with the retaining portions 66, the cap 61 is fixed to the container body 62.

In this embodiment, plural cuts 67, which extend radially from the center of the disc-like portion 63, are formed in an area of the cap 61 except the edge portion of the disc-like portion.

A description will now be given of the operation of the welding wire container constructed as above. In the welding wire manufacturing process, a welding wire is dropped coilwise into the container body 62, then the cap 61 is fitted on the opening portion of the container body 62 and the engaging portions 65 are retained by the retaining portions 66, whereby the cap 61 is fixed to the container body 62.

Figure 15:
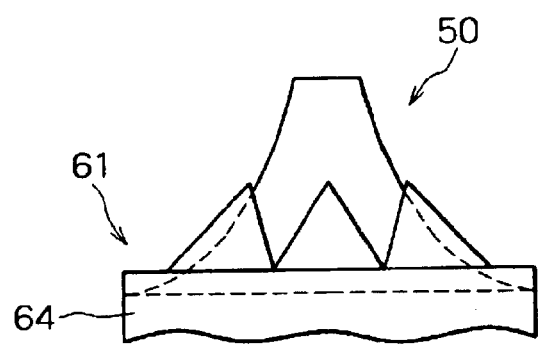
FIG. 15 illustrates the operation of the fourth embodiment.

The welding wire is fed in this state to a user. The user removes the cap 61, places the wire draw-out jig 50 shown in FIG. 13 on the opening portion of the container body 62 and then applies the cap 61 onto the container body 62 from above the wire draw-out jig 50. As a result, as shown in FIG. 15, the central projection of the wire draw-out jig pushes the radial cuts 67 of the cap 61, causing the cuts 67 to expand, so that the wire draw-out jig 50 projects above the cap 61 and its central portion becomes exposed. Then, the engaging portions 65 are retained again by the retaining portions 66 to fix the cap 61 to the container body 62. Further, a conduit tube (not shown) is connected to the connector 53.

Thereafter, the user is required to insert his or her hand into the wire draw-out jig 50 through the opening of the jig and conducts the tip of the welding wire into the conduit tube, whereby the welding wire can be drawn out from the container.

Figure 16A:
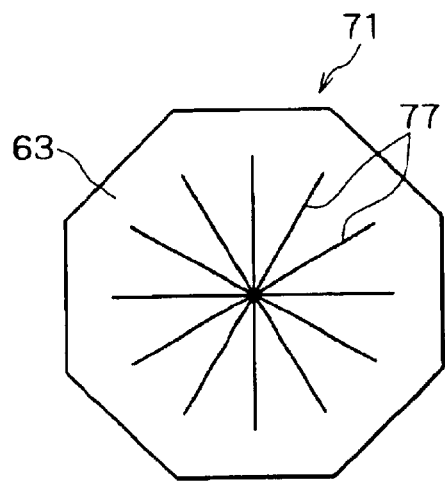
FIG. 16a is a plan view of a cap used in a fifth embodiment of the present invention and FIG. 16b is a perspective view showing a mounted state of the cap to a container body.
Figure 16B:
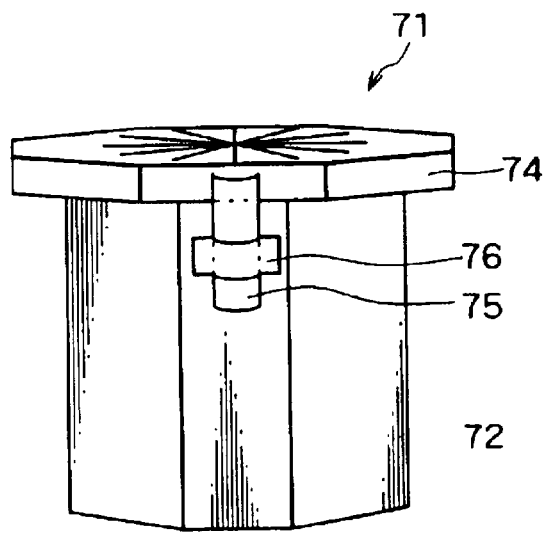

A description will now be given of a fifth embodiment of the present invention with reference to FIG. 16. In this fifth embodiment, a cap 71 is in the shape of a regular octagon. A regular octagon portion 73 has an, edge portion 74 and is formed with plural cuts 77 extending radially.

A container body 72 is in the shape of a bottomed cylinder having a cross section of a regular octagon. The cap 71 and the container body 72 can be fixed together by retaining engaging portions 75 of the cap 71 with retaining portions 76 of the container body 72.

Also in this embodiment, by placing the wire draw-out jig on an opening portion of the container body 72 and fitting the cap 71 thereon, the wire draw-out jig can be fixed between the container body 72 and the cap 71.

In the above embodiments, the wire draw-out jig 50 pushes open the caps 61 and 71 by utilizing the cuts 67 and 77 formed on the caps, whereby it becomes possible to fix the caps to the container body in the mounted state of the wire draw-out jig. In the present invention, no limitation is made to the cuts, but perforations may be formed instead. In case of forming perforations, by pushing down the caps 61 and 71 from above the wire draw-out jig 50, the perforations are broken and the caps are forced open by the wire draw-out jig 50 in the same manner as in FIG. 15.

Thus, also in the embodiment with perforations formed, not only there can be obtained the same effect as in the case of the container shown in FIG. 14, but also during storage of the welding wire the welding wire, which is placed in a coiled state within the container, is kept in a relatively hermetically-sealed state and can be prevented from absorbing moisture from the external environment.

If the perforations are exposed to the exterior of the container body after assembly, the welding wire located inside is easy to absorb moisture from the outside air, so a bad influence is exerted on the welding wire. On the other hand, since corrugated cardboard usually has a structure of plural layers, it is preferable that perforations be formed from the inside toward the outside, because an outside opening can be made smaller and hence it is possible to suppress the moisture absorption of the welding wire located inside.

From the same standpoint as above it is desirable that a corrugated cardboard having been subjected to a water-repelling treatment be used as an outer surface of the container at the time of assembly.

Figure 17A:
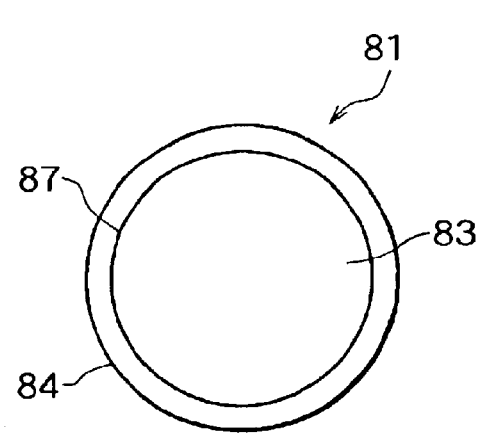
FIG. 17a is a plan view of a cap used in a sixth embodiment of the present invention and FIG. 17b is a perspective view showing a mounted state of the cap to a container body.
Figure 17B:
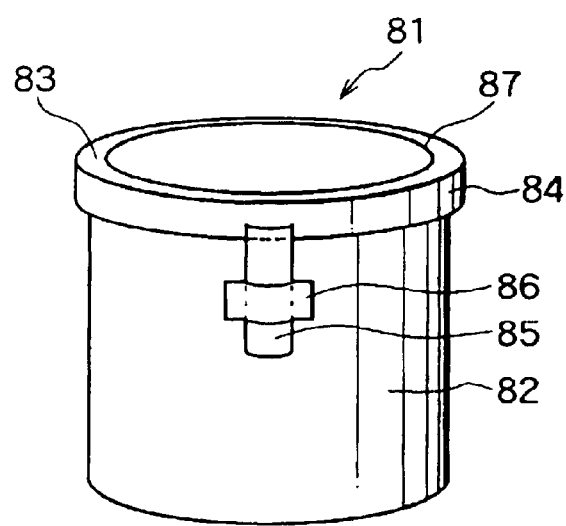

A welding wire container according to a sixth embodiment of the present invention will now be described with reference to drawings attached hereto. FIG. 17a is a plan view showing a cap of the welding wire container of the sixth embodiment and FIG. 17b is a perspective view thereof. A container body 82 is in the shape of a bottomed cylinder and a cap 81 is fitted on an upper-end opening portion of the container body 82. Both container body 82 and cap 82 are formed of paper, e.g., corrugated cardboard.

The cap 81 has a disc-like portion 83 and an edge portion 84 of the disc-like portion. Engaging portions 85 for fixing the cap 81 are fixed to the edge portion 84. Retaining portions 86 for retaining the engaging portions 85 are formed on the peripheral surface of the container body 82. By retaining the engaging portions 85 with the retaining portions 86, the cap 81 is fixed to the container body 82.

In this embodiment, circularly extending perforations 87 are formed in the disc-like portion 83 of the cap 81. By pushing a central part of the disc-like portion 83, the perforations 87 are broken, permitting the portion 83 to be gouged out except a peripheral edge part thereof.

Figure 18:
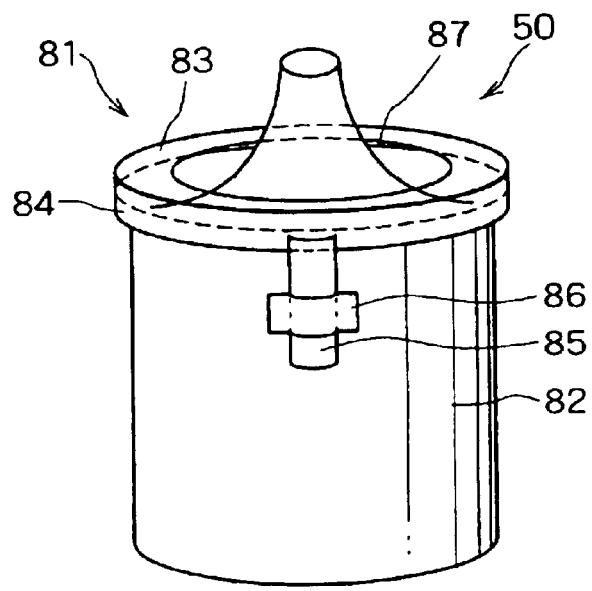
FIG. 18 illustrates the operation of the sixth embodiment.

The operation of the welding wire container of this embodiment is basically the same as in the fourth embodiment. As shown in FIG. 18, the central projection of the wire draw-out jig 50 ruptures the perforations 87 of the cap 81 and gouges out the area surrounded with the perforations, then the wire draw-out jig 50 projects above the cap 81 and the central part thereof becomes exposed.

The size of the hole scooped along the perforations 87 is preferably 10 to 20 mm smaller than the outer surface shape of the wire draw-out jig 50 with the cap 81 mounted. In this embodiment, since the cross section of the wire draw-out jig is circular, it is preferable that the hole scooped by the perforations 87 be 10 to 20 mm smaller than the outside diameter of the circle of the said cross section. By so setting, the wire draw-out jig 50 can be held stably by the cap 81.

Figure 19A:
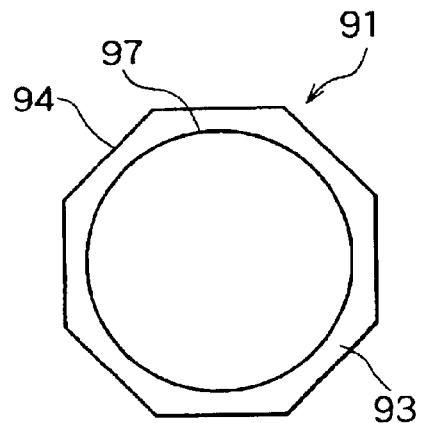
FIG. 19a is a plan view of a cap used in a seventh embodiment of the present invention and FIG. 19b is a perspective view showing a mounted state of the cap to a container body.
Figure 19B:
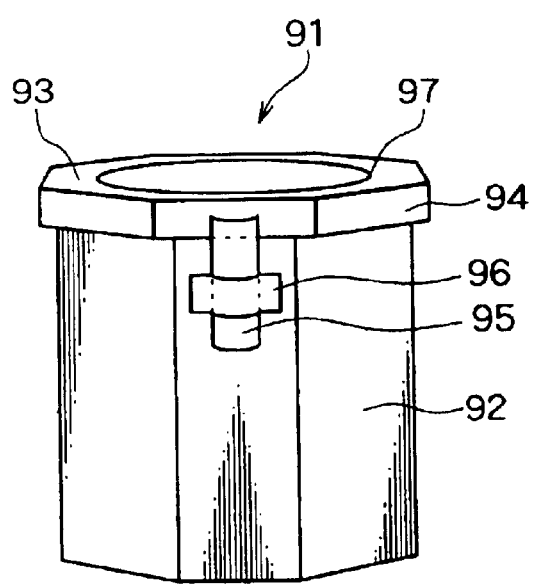

Description is now directed to a seventh embodiment of the present invention with reference to FIG. 19. In this seventh embodiment, a cap 91 has a regular octagon shape, and a regular octagon portion 93 has an edge portion 94 and is formed with perforations 97 extending circularly.

A container body 92 is in the shape of a bottomed cylinder having a cross section of a regular octagon. The cap 91 and the container body 92 can be fixed together by retaining engaging portions 95 of the cap 91 with retaining portions 96 of the container body 92.

Figure 20:
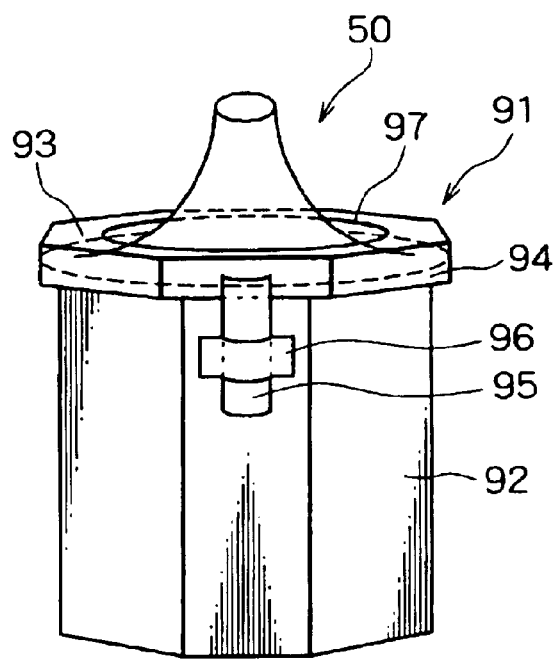
FIG. 20 illustrates the operation of the seventh embodiment.

Also in this embodiment, as shown in FIG. 20, by placing the wire draw-out jig 50 on an opening portion of the container body 92 and fitting the cap 91 thereon, the portion surrounded with the perforations 97 of the cap 91 is pushed with the projection of the wire draw-out jig 50 and is gouged out. Thus, the wire draw-out jig can be fixed between the container body 92 and the cap 91.

Although in the above embodiments the circular perforations 87 and 97 are formed respectively in the caps 81 and 91 of the cylindrical container body 82 and the prismatic container body 92, no limitation is made thereto, but various modifications may be made.

Figure 21A:
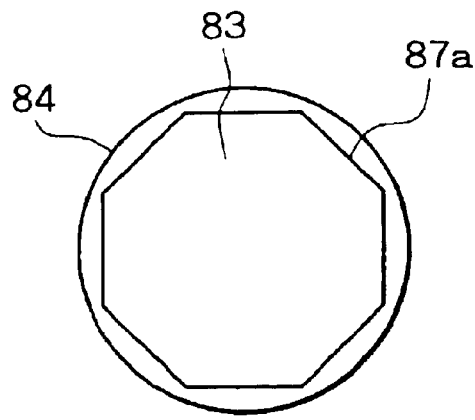
FIGS. 21a and 21b illustrate perforation shapes as modifications.
Figure 21B:
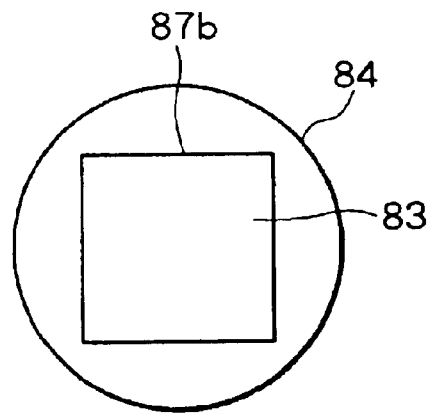

For example, in FIG. 21a, a container body is cylindrical, that is, a cap edge 84 is circular, and perforations 87a of a regular octagon shape are formed in a disc-like portion 83 of the cap. In FIG. 21b, perforations 87b of a square shape are formed in the disc-like portion 83.

Figure 22A:
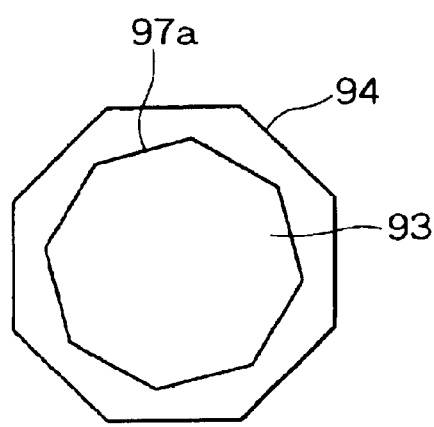
FIGS. 22a to 22d illustrate perforation shapes as modifications.
Figure 22B:
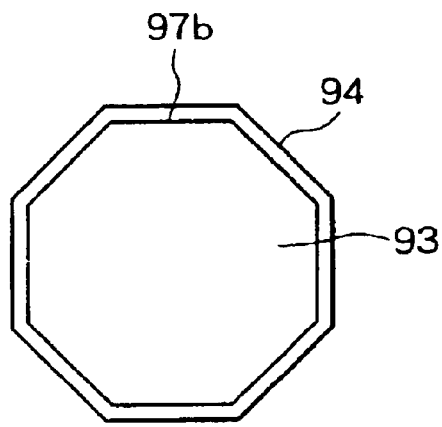
Figure 22C:
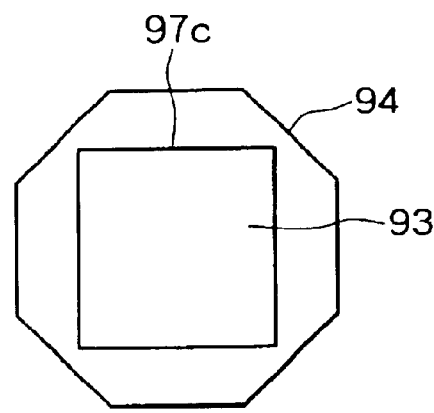
Figure 22D:
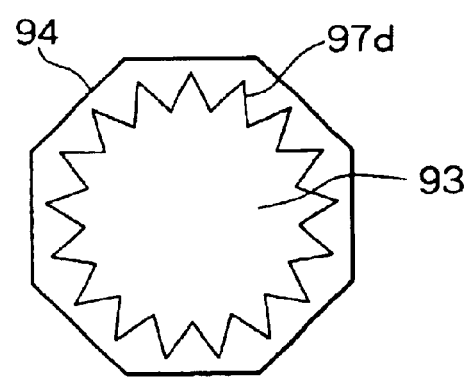

In FIGS. 22a to 22d and FIGS. 23a to 23d, container bodies are in the shape of a regular octagon, that is, cap edges 94 are in a regular octagon shape, and perforations of various shapes are formed in cap portions 93. Perforations 97a shown in FIG. 22a are in a regular octagon shape, but corners thereof are deviated from corners of the cap 91. Perforations 97b shown in FIG. 22b are also in a regular octagon shape and corners thereof are aligned with corners of the cap 91. Perforations 97c shown in FIG. 22c are in a square shape. Perforations 97d shown in FIG. 22d are star-shaped.

Figure 23A:
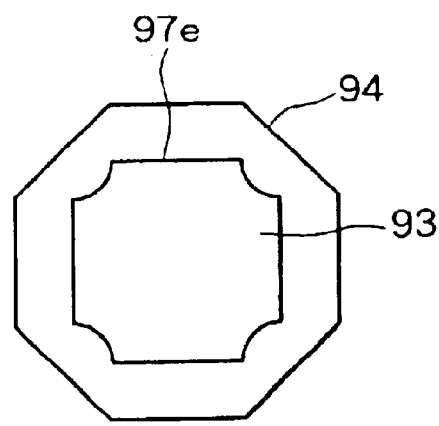
FIGS. 23a to 23d illustrate perforation shapes as further modifications.
Figure 23B:
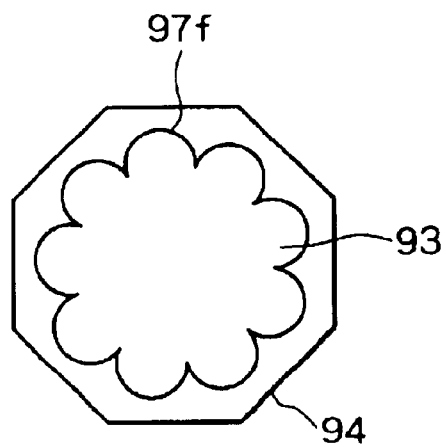
Figure 23C:
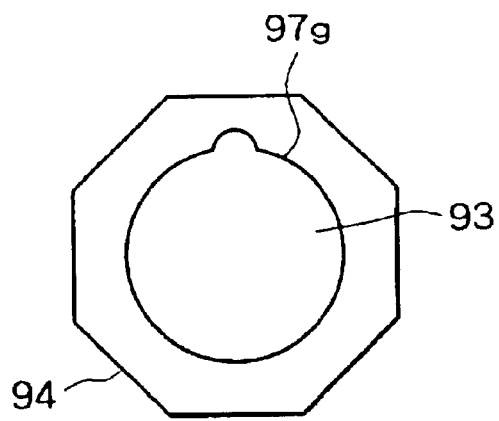
Figure 23D:
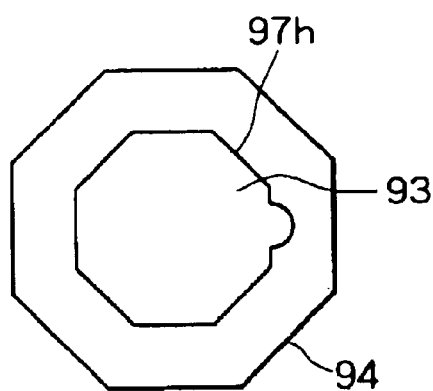

Perforations 97e shown in FIG. 23a are in a square shape with four corners depressed in an arcuate shape. Perforations 97f shown in FIG. 23b are petal-shaped. Perforations 97g shown in FIG. 23c are in a circular shape with a semi-arcuate protuberance formed in part. Further, perforations 97h shown in FIG. 23d are in a regular octagon shape with a semi-arcuate protuberance formed in part.

Various other shapes of perforations may be formed in conformity with the shape of an outer surface of the wire draw-out jig used. Substituents for perforations may be used if only they permit a part of the cap to be gouged out by being pushed with the central projection of the wire draw-out jig.

The outer surface of the cap may be sealed with a transparent resin sheet for example and this sheet may be peeled off in a welding work. By so doing, it is possible to surely prevent oxidation and moisture absorption of the welding wire while the wire is stored within the container body.

If perforations are exposed to the exterior of the container body after assembly, the welding wire located inside absorbs moisture easily from the outside air and therefore a bad influence is exerted to the wire. On the other hand, since a corrugated cardboard usually has a structure of plural layers, it is preferable that perforations be formed from the inside toward the outside, because an outside opening becomes smaller. Therefore, in case of using a corrugated cardboard as the material, it is desirable for perforations to be formed in the container inner surface, whereby an outside opening can be made smaller. Consequently, it is possible to suppress the moisture absorption of the welding wire located inside.

Further, from the same viewpoint as above, it is desirable that a corrugated cardboard which has gone through a water-repelling treatment be used as the outer surface of the container at the time of assembly.

In the above fourth to seventh embodiments the wire draw-out jig 50 can be fixed to the container bodies 62, 72, 82, and 92 easily without the need of using any special fixing means. Besides, since the container bodies 62, 72, 82, 92 and the caps 61, 71, 81, 91 are made of paper, they can be discarded after the use of the welding wire, with no need of recovering them. Thus, it is possible to cut down the recovery cost.

Particularly in such container bodies 72 and 92 as in the fifth and seventh embodiments, which are prismatic, there accrues an advantage that they are easy to be folded and are easy to be returned in the folded state to the manufacturer. Anyhow, in these embodiments there no longer is such a waste as in the prior art wherein empty packs are transported as they are for return to the manufacturer. Consequently, it is possible to cut down the cost for the recovery and transport of the container after use.

Figure 24:
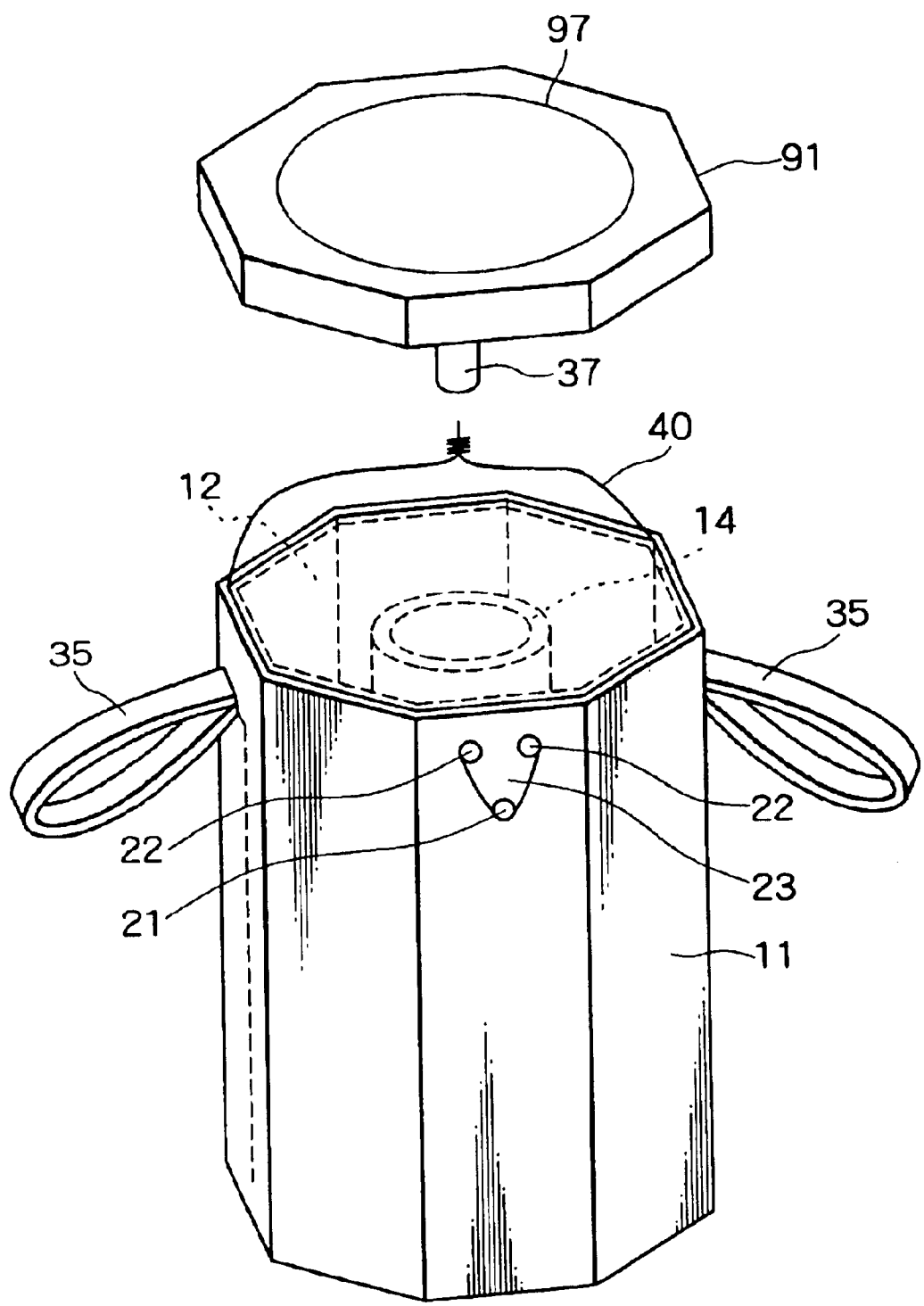
FIG. 24 is a perspective view of an eighth embodiment of the present invention.

Next, a description will be given of an eighth embodiment of the present invention illustrated in FIG. 24. In this embodiment, the cap 16 used in the first embodiment is replaced with a cap having circular perforations 97 such as the cap 91 used in the seventh embodiment. According to this eighth embodiment there accrues an advantage that the fixing of the wire draw-out jig to the container body becomes easy, in addition to the advantage of the first embodiment. In this embodiment, moreover, the cap 91 used in the seventh embodiment may be substituted by the cap 71 used in the fifth embodiment.

The foregoing invention has been described in terms of preferred embodiments. However, those skilled, in the art will recognized that many variations of such embodiments exist. Such variations are intended to be within the scope of the present invention and the appended claims.

What is claimed is:

1. A welding wire container comprising:
   a bottomed outer cylinder made of paper;
   an inner cylinder made of paper and inserted inside said outer cylinder;
   a bag formed by a resin film and disposed inside said outer cylinder so as to enclose said inner cylinder therein; and
   a string-like support member extending between said outer cylinder and said inner cylinder and drawn out to the exterior from a pair of apertures formed in said outer cylinder, with holder portions to be grasped by hands being formed at both externally drawn-out ends of said support member.

2. The welding wire container according to claim 1, wherein said bag contains a vaporizable rust preventive.

3. The welding wire container according to claim 2, wherein said vaporizable rust preventive is applied to an inner surface of said bag.

4. The welding wire container according to claim 2, wherein said vaporizable rust preventive contains dicyclohexylamine nitrite or diisopropylamine nitrite.

5. The welding wire container according to claim 1, further comprising a sheet, said sheet containing a vaporizable rust preventive and being disposed on the welding wire which is received in a coiled state within the container.

6. The welding wire container according to claim 5, wherein said vaporizable rust preventive is applied to a lower surface of said sheet.

7. The welding wire container according to claim 5, wherein said vaporizable rust preventive contains dicyclohexylamine nitrite or diisopropylamine nitrite.

8. The welding wire container according to claim 1, wherein said bag is made of polyethylene or polyvinyl chloride.

9. The welding wire container according to claim 1, further comprising a cap made of paper and fitted on an upper edge of said outer cylinder.

10. The welding wire container according to claim 1, further comprising: a pedestal made of paper and disposed at a bottom of said inner cylinder; and a core member disposed centrally of said pedestal and coaxially with said outer cylinder and said inner cylinder.

11. The welding wire container according to claim 1, wherein said resin film which constitutes said bag has a thickness of not less than 60 $\mu$m.

12. The welding wire container according to claim 1, wherein said outer cylinder and said inner cylinder are each formed in a prismatic shape comprising rectangular side walls.

13. The welding wire container according to claim 1, wherein said bag is formed so that an opening portion thereof can be closed.

14. The welding wire container according to claim 1, further comprising an outer bag formed by a resin film and adapted to enclose said outer cylinder therein from the outside.

15. The welding wire container according to claim 1, wherein a band formed by a resin film is wound round the outside of said outer cylinder.

* * * * *

UNITED STATES PATENT AND TRADEMARK OFFICE
CERTIFICATE OF CORRECTION

PATENT NO.   : 6,827,217 B2
DATED        : December 7, 2004
INVENTOR(S)  : Matsuguchi et al.

It is certified that error appears in the above-identified patent and that said Letters Patent is hereby corrected as shown below:

<u>Title page,</u>
Item [73], Assignee, should read:
-- [73]   Assignee:  **Kabushiki Kaisha Kobe Seiko Sho
                    (Kobe Steel, Ltd.),** Kobe (JP) --.

Signed and Sealed this

First Day of March, 2005

JON W. DUDAS
*Director of the United States Patent and Trademark Office*